Sept. 7, 1943. H. S. OGDEN 2,328,994
PROTECTIVE SYSTEM
Filed Oct. 8, 1941
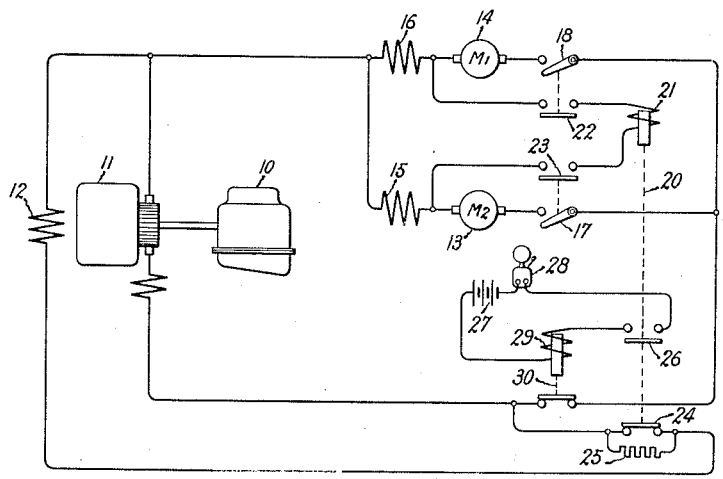
Inventor:
Harold S. Ogden,
by Harry E. Dunham
His Attorney.

Patented Sept. 7, 1943

2,328,994

UNITED STATES PATENT OFFICE 2,328,994

PROTECTIVE SYSTEM

Harold S. Ogden, Erie, Pa., assignor to General Electric Company, a corporation of New York Application October 8, 1941, Serial No. 414,130

7 Claims. (Cl. 172—179)

My invention relates to protective systems for electric motors, and more particularly to systems for protecting a plurality of electric traction motors against wheel slippage, and has for its object a simple and reliable protective system of this type.

In the operation of a plurality of electric motors separately connected to the driving axles of a vehicle one pair of wheels connected to an axle sometimes slips on the track, especially when rapid acceleration is attempted under heavy load conditions. When this slipping occurs, the motor or motors connected to the slipping axle accelerate to a higher speed than the other motors and may reach a speed causing damage to the accelerated motor on account of the resulting high mechanical stresses. Furthermore, when the traction motors are connected for energization in parallel circuit relation, the slipping of one pair of wheels relieves the connected motor of any substantial portion of the load so that the remaining motors connected to non-slipping wheels are subject to damage from high overload currents.

In carrying out my invention I provide a protective device responsive to abnormal differences in the voltage drops across selected portions of a pair of parallel-connected electric traction motors. The protective device may be arranged to perform any one or more of a number of indicative or remedial operations. For example, a slip relay, according to my invention, may be arranged to reduce the energization of the motors, as by weakening the field of the main generator or by opening the motor circuit. If desired, the relay may be used merely to give an indication of the undesirable condition, as by energizing a bell or buzzer. In a more elaborate system, one or more of these protective functions may be combined. For example, a slip relay may be arranged to reduce the energization of the generator field upon a relatively small difference in the motor currents and subsequently to completely disable the motor circuit upon the occurrence of an excessive difference in the motor currents.

For a more complete understanding of my invention, reference should now be had to the following detailed specification, taken in conjunction with the accompanying drawing, the single figure of which is a diagrammatic representation of my invention as applied to an electrically-operated vehicle such as an electric locomotive.

Referring to the drawing, I have shown my invention in one form as applied to a self-propelled electric vehicle comprising a prime mover such as an internal combustion engine 10 connected to drive a direct current generator 11 having a shunt field exciting winding 12. The generator 11 is connected to supply current to a pair of similar parallel-connected direct current traction motors having armatures 13 and 14 and series field exciting windings 15 and 16, respectively. The motors 13, 15, and 14, 16 are energized respectively through a pair of line contactors 17 and 18.

To provide indication of or protection against slippage of the vehicle wheels connected to either of the motor armatures 13 or 14, I provide a slip relay 20 having an actuating coil 21 connected to measure the difference in the voltage drops across the traction motor series field windings. For this purpose one terminal of the actuating coil 21 is connected through an interlock contact 22 of the line breaker 18 to the traction motor 14, 16 at a point between its armature and its series field winding, while the other terminal of the actuating winding 21 is connected through an interlock contact 23 on the line breaker 17 to the traction motor 13, 15 at a point between its armature and series field winding. The winding 21 is thus connected between points of normally equal potential and completes a loop circuit including the motor series field windings. The slip relay armature may suitably be provided with a normally-closed interlock contact 24 arranged normally to short circuit a generator shunt field resistor 25. If desired, the relay 20 may also be provided with a normally open interlock contact 26 arranged to complete an energizing circuit from a control battery 27 to an indicating device 28 and to an actuating coil 29 of an emergency line breaker 30.

Under ordinary conditions of operation, without slippage of any of the driving wheels of the vehicle connected to the motor armatures 13 and 14, the traction motor series field windings 15 and 16 will carry substantially equal currents and the voltage drops across these field windings will likewise be substantially equal. Thus the opposite terminals of the actuating winding 21 of the slip relay 20 will be maintained at substantially the same potential and the winding 21 will carry no current.

In the event of slippage of the wheels connected to one of the traction motors, the slipping motor will be substantially unloaded and its speed and back E. M. F. will rise. For example, if the wheels connected to the motor armature 14 begin to slip, the rising back E. M. F. will cause a decrease in motor current, since the total voltage across the motors is maintained substantially constant by the generator 11. Simultaneously, the motor 13, 15 will take on more of the load and its current will increase. Because of the difference in motor currents thus produced, the voltage drops across the series field windings 15 and 16 are now no longer equal, and the actuating winding 21 of the slip relay 20 will carry a current which, if sufficiently large, will actuate the relay to operate its various interlock contacts. It will be understood, of course, that the actuating winding 21 is designed to operate the relay only upon any voltage differential across the traction motor series field windings which is greater than that normally encountered due to differences in wheel sizes and various manufacturing tolerances.

In the embodiment of my invention shown in the drawing, the relay 20 is arranged first to open its interlock contact 24 to reduce the excitation of the generator shunt field winding 12 and subsequently, if the wheel slippage persists, to close its interlock contact 26 thereby to completely disable the traction motors by opening the line contactor 30. The interlock contact 26 also gives an indication of the slippage condition by completing an energizing circuit for an indicating device 28.

While I have shown one preferred embodiment of my invention by way of illustration, many other modifications will occur to those skilled in the art. For example, it will be evident that the slip relay 20 may be arranged either to reduce the generator excitation or to disable the motor circuit completely or merely to give an indication of the slippage condition or it may be arranged to perform any combination of these functions either simultaneously or successively as desired. I therefore wish to have it understood that I intend by the appended claims to cover all such modifications as fall within the true spirit and scope of my invention.

What I claim as new and desire to secure by Letters Patent of the United States, is:

1. In combination with a plurality of electric motors connected to drive spaced wheels of a vehicle, each of said motors having an armature and a series field winding, means for supplying current to said motors in parallel circuit relation with each other, switching means for reducing the current supplied to said motors, and a relay having an actuating winding connected to similar points of normally equal potential on two of said series field windings for controlling said switching means thereby to prevent excessive overspeeding of at least one of said motors with respect to at least one other of said motors.

2. In combination with a plurality of electric motors connected to drive spaced wheels of a vehicle, each of said motors being provided with an armature and a series field winding having a terminal connected to said armature, an electric generator connected to supply current to said motors in parallel circuit relation with each other, said generator having a field exciting winding, switching means for reducing the energization of said field exciting winding, and means for preventing excessive overspeeding of at least one of said motors with respect to at least one other of said motors comprising a relay having contacts arranged to control said switching means and an actuating winding connected between said terminals of two of said series field windings.

3. In combination with a plurality of electric motors connected to drive spaced wheels of a vehicle, each of said motors being provided with an armature and a series field winding having a terminal connected to said armature, means for supplying current to said motors in parallel circuit relation with each other, switching means for disabling said motors, and means for preventing excessive overspeeding of at least one of said motors with respect to at least one other of said motors comprising a relay having contacts arranged to control said switching means and having an actuating winding connected between said terminals of at least two of said series field windings.

4. In combination with a plurality of electric motors connected to drive spaced wheels of a vehicle, each of said motors being provided with an armature and a series field winding having a terminal connected to said armature, an electric generator connected to supply current to said motors in parallel circuit relation with each other, said generator having a field exciting winding, switching means for reducing the excitation of said field exciting winding, signal means for indicating excessive overspeeding of at least one of said motors with respect to at least one other of said motors, and a relay for actuating said switching means and said signal means in sequential time relation, said relay having an actuating coil connected between said terminals of at least two of said series field windings thereby to respond to abnormal differences in the voltage drops across said windings.

5. The combination with a plurality of electric motors having series field windings, of means for supplying electric current to said motors in parallel circuit relation, and means for preventing excessive overspeeding of at least one of said motors with respect to at least one other of said motors comprising circuit controlling means responsive to an abnormal difference of the voltage drops across selected similar portions of said motors.

6. The combination with a plurality of electric motors having series field windings, of means for supplying electric current to said motors in parallel circuit relation, and means for avoiding excessive overspeeding of at least one of said motors with respect to at least one other of said motors comprising a circuit controlling relay having an actuating winding connected to similar points of normally equal potential on at least two of said series field windings, whereby said relay operates in response to a differential motor current resulting from overspeeding of one of said motors.

7. The combination with a plurality of electric motors each having an armature and a series field winding and connected to drive spaced wheels of a vehicle, of means for supplying electric current to said motors in parallel circuit relation with each other, and means for preventing excessive overspeeding of at least one of said motors with respect to at least one other of said motors comprising switching means for reducing the current supplied to said motors, and means differentially responsive to the voltage drops across said series field winding for controlling said switching means.

HAROLD S. OGDEN.